(12) United States Patent
Boer

(10) Patent No.: US 8,251,433 B2
(45) Date of Patent: Aug. 28, 2012

(54) MOTOR VEHICLE WINDSHIELD AND WINDOW KIT

(76) Inventor: James R. Boer, Tucson, AZ (US)

( * ) Notice: Subject to any disclaimer, the term of this patent is extended or adjusted under 35 U.S.C. 154(b) by 244 days.

(21) Appl. No.: 12/461,295

(22) Filed: Aug. 6, 2009

(65) Prior Publication Data

US 2010/0045062 A1 Feb. 25, 2010

Related U.S. Application Data

(60) Provisional application No. 61/136,290, filed on Aug. 25, 2008.

(51) Int. Cl.
*B60J 3/00* (2006.01)

(52) U.S. Cl. .............. 296/97.7; 160/370.23; 296/152

(58) Field of Classification Search ............ 296/190.01, 296/191, 152, 83, 95.1, 97.7; 160/370.21, 160/370.23

See application file for complete search history.

(56) References Cited

U.S. PATENT DOCUMENTS

| | | | |
|---|---|---|---|
| 2,944,601 A * | 7/1960 | Compson | 160/370.21 |
| 3,338,293 A * | 8/1967 | Hohmann | 160/370.21 |
| 3,751,100 A | 8/1973 | Keyes | |
| 4,109,957 A | 8/1978 | Polizzi et al. | |
| 4,560,245 A | 12/1985 | Sarver | |
| 4,647,102 A | 3/1987 | Ebrahimzadeh | |
| 4,759,581 A | 7/1988 | McNamee | |
| 4,779,918 A | 10/1988 | McNamee | |
| 4,790,591 A * | 12/1988 | Miller | 160/370.21 |
| 4,838,334 A | 6/1989 | Hogg et al. | |
| 4,846,523 A * | 7/1989 | Whitaker, Jr. | 296/93 |
| 4,862,943 A * | 9/1989 | Shafia | 160/370.21 |
| 5,042,551 A | 8/1991 | Ein et al. | |
| 5,064,239 A * | 11/1991 | Folcik | 296/97.7 |
| 5,121,957 A * | 6/1992 | O'Shea | 296/1.04 |
| 5,183,094 A * | 2/1993 | Montasham et al. | 160/370.21 |
| 5,562,142 A | 10/1996 | Ziel et al. | |
| 5,732,759 A * | 3/1998 | Wang | 160/370.21 |
| 5,992,498 A * | 11/1999 | Boston | 160/370.22 |
| 6,135,193 A * | 10/2000 | Lloyd | 160/370.23 |
| 6,289,968 B1 * | 9/2001 | Karten et al. | 160/370.23 |
| 6,682,121 B1 * | 1/2004 | Conforti | 296/97.5 |
| 7,216,917 B2 | 5/2007 | Tadakamalla | |
| 2007/0257478 A1 * | 11/2007 | Metzikis | 280/770 |
| 2011/0239369 A1 * | 10/2011 | Dobin | 5/502 |

* cited by examiner

*Primary Examiner* — Jason S Morrow
(74) *Attorney, Agent, or Firm* — Richard C. Litman

(57) ABSTRACT

The motor vehicle windshield and window kit includes a plurality of insulated panels for covering respective interior surfaces of a windshield and at least one window of a motor vehicle to prevent sunlight and environmental noise from entering the motor vehicle, and for further providing privacy for the occupants of the motor vehicle. At least one privacy flap is substantially centrally formed through at least one of the plurality of insulated panels. Additionally, a plurality of releasable fasteners are provided for releasably securing the plurality of insulated panels to the interior surfaces of the motor vehicle windshield and the at least one motor vehicle window, so that the insulated panels cover the motor vehicle windshield and the at least one motor vehicle window to provide privacy, thermal insulation and acoustic insulation for the interior of the motor vehicle.

8 Claims, 5 Drawing Sheets

MOTOR VEHICLE WINDSHIELD AND WINDOW KIT

CROSS-REFERENCE TO RELATED APPLICATION

This application claims the benefit of U.S. Provisional Patent Application Ser. No. 61/136,290, filed Aug. 25, 2008.

BACKGROUND OF THE INVENTION

1. Field of the Invention

The present invention relates to a combined insulating and privacy sunshade kit for the windshield and windows of a motor vehicle.

2. Description of the Related Art

Motor vehicle window sunshields are well known in the art. A typical sunshield is formed from a foldable sheet of cardboard. When unfolded, the sheet of cardboard can be placed across an interior surface of a windshield of a motor vehicle to block most of the sunlight coming through the windshield. This type of sunshield reduces heat buildup inside the motor vehicle and provides some degree of privacy through the front windshield, but not through either of the side windows. Additionally, the cardboard is not particularly efficient at reflecting or absorbing sounds generated exterior to the vehicle.

Sun shading, noise, and privacy are important factors to motor vehicle drivers and passengers, particularly in motor vehicles, which are parked. This is particularly true with respect to large tractor-trailer trucks that carry cargo and travel across a state or the country, because the drivers often sleep in their cabs in order to save money and time. The folded cardboard sunshield only covers the front windshield and not the windows, thus providing little privacy and ineffective thermal and acoustic insulation. Thus, a motor vehicle windshield and window kit solving the aforementioned problems is desired.

SUMMARY OF THE INVENTION

The motor vehicle windshield and window kit includes a plurality of insulated panels for covering respective interior surfaces of a windshield and at least one window of a motor vehicle to prevent sunlight and environmental noise from entering the motor vehicle, and for further providing privacy for the occupants of the motor vehicle. At least one privacy flap is substantially centrally formed through at least one of the plurality of insulated panels. Additionally, a plurality of releasable fasteners are provided for releasably securing the plurality of insulated panels to the interior surfaces of the motor vehicle windshield and the at least one motor vehicle window, such that the insulated panels cover the motor vehicle windshield and the at least one motor vehicle window to provide privacy, thermal insulation and acoustic insulation for the interior of the motor vehicle.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
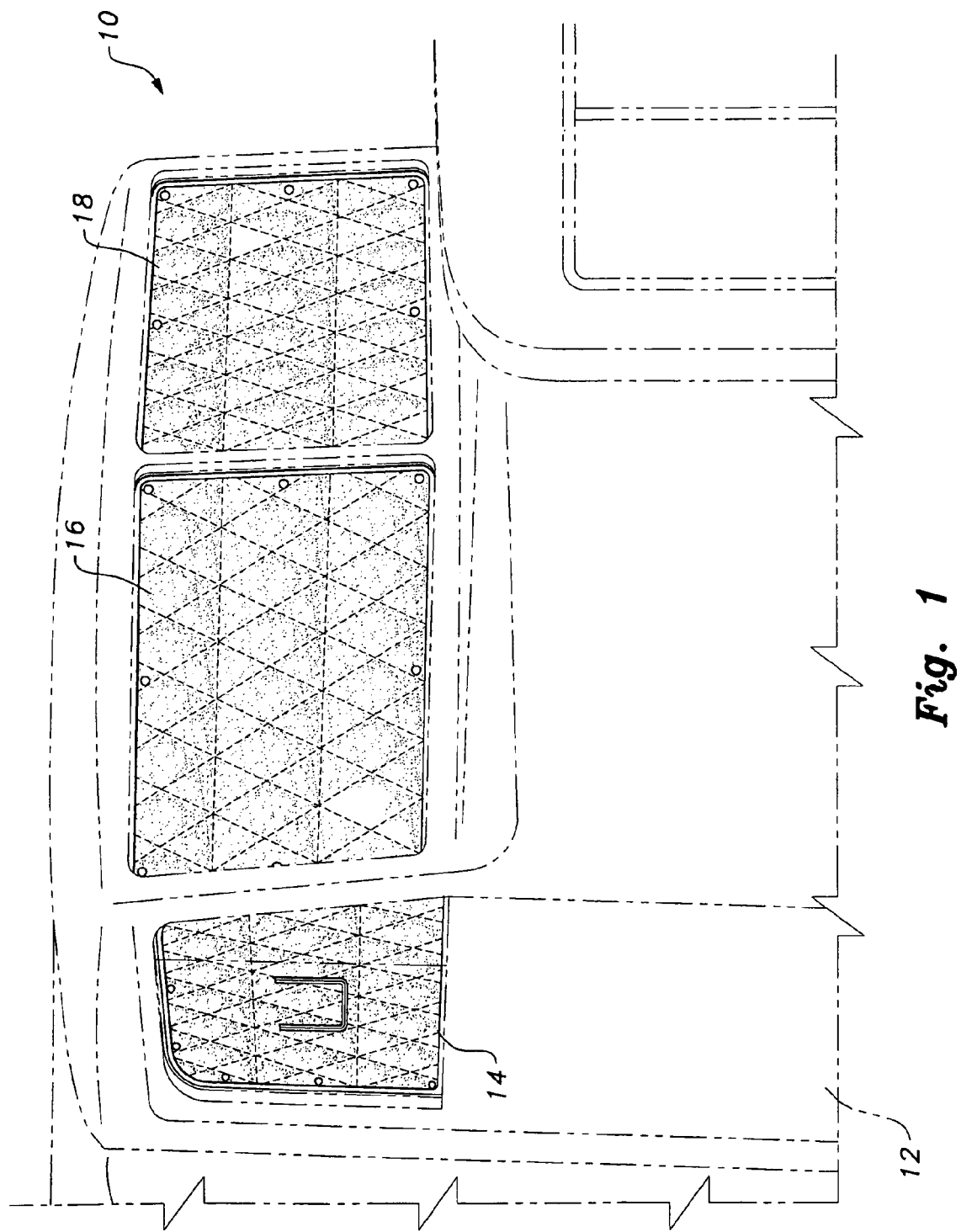
FIG. 1 is an environmental, perspective view of a motor vehicle windshield and window kit according to the present invention.
Figure 3:
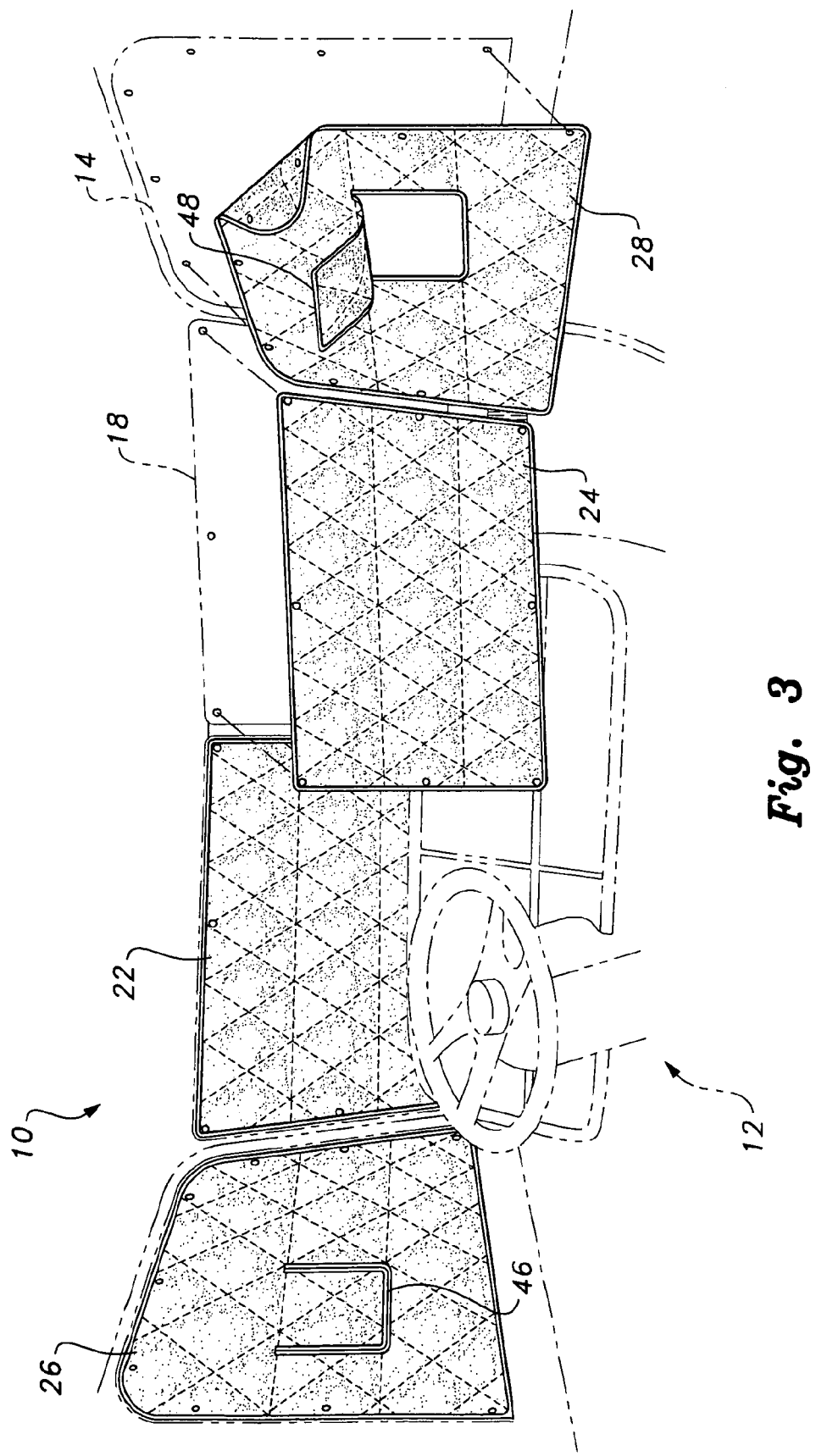
FIG. 3 is an environmental, perspective view of the motor vehicle windshield and window kit according to the present invention.

The present invention relates to a motor vehicle windshield and window kit, generally indicated by the numeral 10 in the drawings. More specifically, the kit 10 includes a plurality of insulated panels that cover the windshield and windows of a motor vehicle, along with any other desired glass surfaces. In the Figures, four such panels are shown, though it should be understood that kit 10 may include any desired number of panels, dependent upon the number of windows in the vehicle. In FIGS. 1 and 3, the kit 10 is shown applied to an exemplary truck 12, with individual panels of the kit 10 being mounted to a passenger's side window 14 of the truck 12, as well as windshields 16, 18 of the truck 12 (a panel is also preferably mounted on a driver's side window, which is not shown in FIG. 1). It should be understood that truck 12, and the windows thereof, are shown for exemplary purposes only, and that the panels of kit 10 may be configured for use with any motor vehicle.

Figure 2:
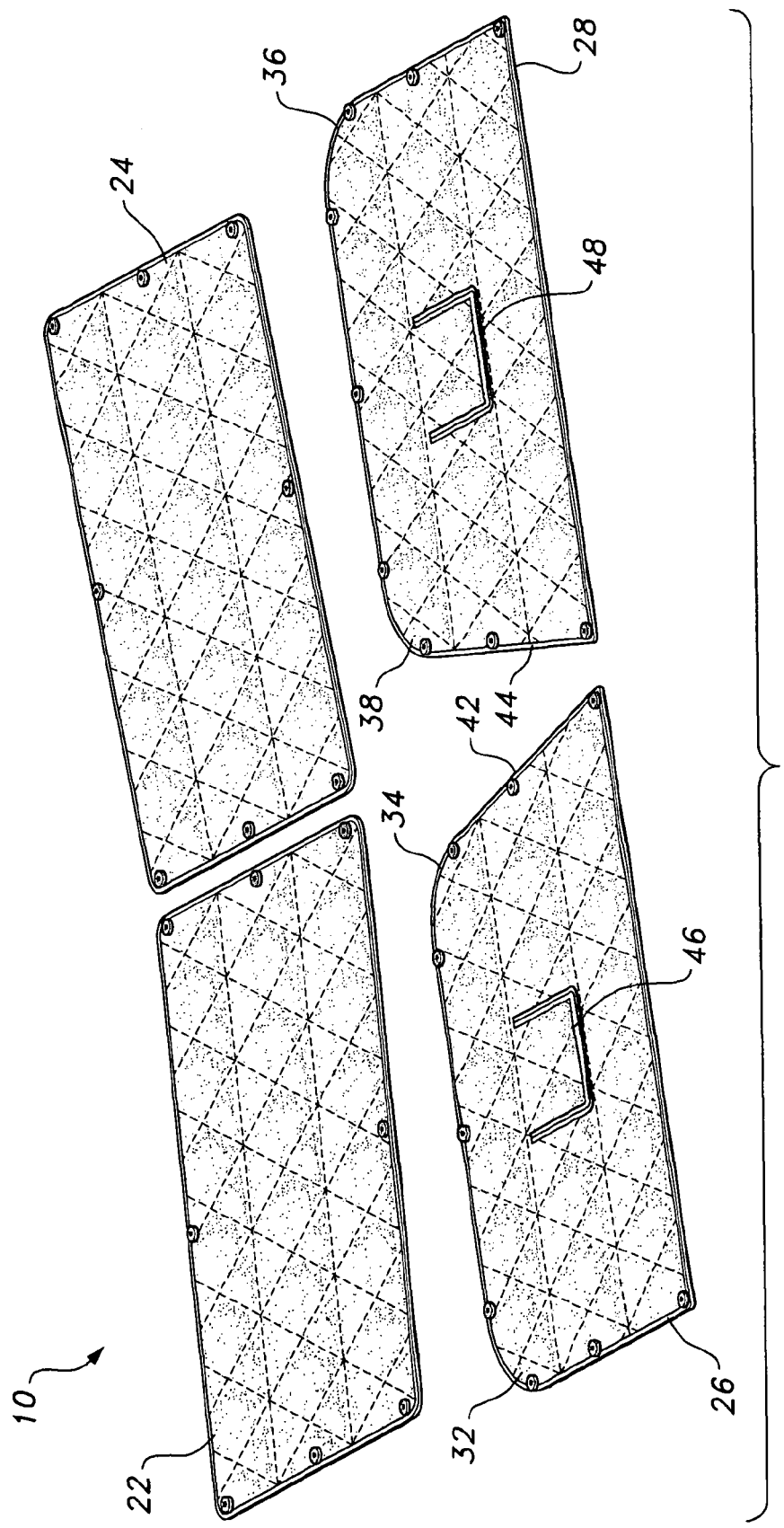
FIG. 2 is an elevational view of the motor vehicle windshield and window kit according to the present invention.

Now referring to FIG. 2, four panel pieces of the kit 10 are shown. As noted above, in the Figures, four such panels are shown, though it should be understood that kit 10 may include any desired number of panels, dependent upon the number of windows in the motor vehicle. In this example, the kit 10 includes a driver's side windshield panel 22 and a passenger's side windshield panel 24. The kit 10 further includes a driver's side window panel 26 and a passenger's side window panel 28. The windshield panels 22, 24 are shown as being substantially rectangular in shape to completely cover the windshields 16, 18 of the truck 12. It should be understood that the individual panels of kit 10 are preferably manufactured in a wide variety of sizes and contours in order to completely cover the windows and windshields of a wide variety of motor vehicles.

The window panels 26, 28 are similarly contoured for covering the windows of the exemplary truck 12, and preferably also have rounded corners 32, 34, 36, and 38. In order to match the windows of the truck, the window panels 26, 28 each include an inclined or slanted side 42, 44 that matches a corner of the window of the truck 12. Each of the panels 22, 24, 26, and 28 are specifically designed for a particular motor vehicle.

Each of the window panels, regardless of the type of motor vehicle to which they are applied, have substantially rectangular shaped privacy flaps or peep holes 46, 48 formed through the centers of the window panels 26, 28. These rectangular privacy flaps 46, 48 allow an occupant in the motor vehicle or truck 12 to view the exterior of the truck 12 without removing or dislodging one of the panels 26 or 28.

FIG. 3 shows an environmental, perspective view of an inside of the truck 12 having the motor vehicle kit 10 mounted in position, with the passenger side panels 24, 28 being placed into position on the windows 18, 14. In FIG. 3, panel 26 is shown with privacy flap 46 in the closed position. On the passenger side of the truck 12, panel 24 is shown being placed over windshield 18 and panel 28 is shown being placed over passenger's side window 14. The privacy flap 48 is shown in the raised position, allowing the passenger to view the exterior of the motor vehicle 12.

Figure 4:
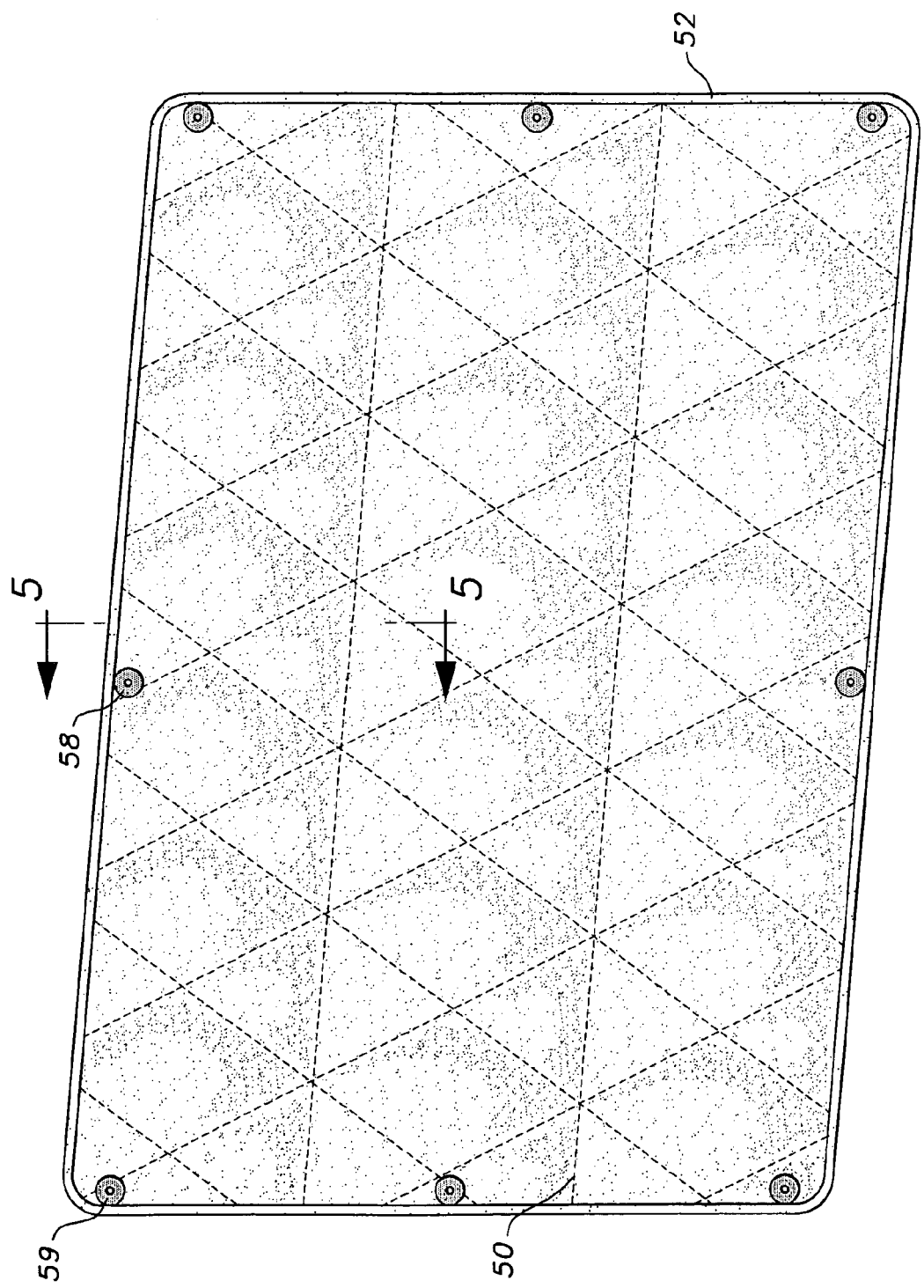
FIG. 4 is an elevational view of a panel of the motor vehicle windshield and window kit according to the present invention.
Figure 5:
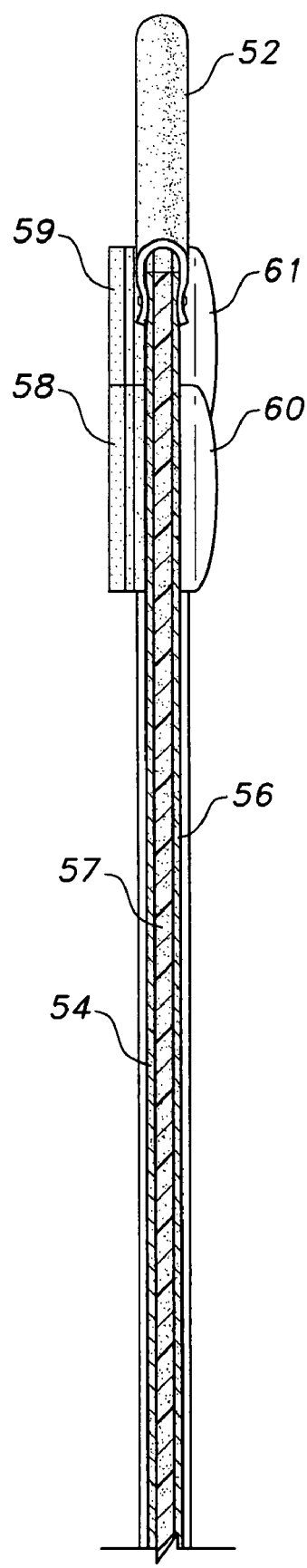
FIG. 5 is a section view taken along lines 5-5 of FIG. 4.

A single one of the panels of kit 10 is shown in FIGS. 4 and 5. The exterior and interior surfaces 56, 54 of each of panels 22, 24, 26, 28 of the kit 10 are preferably formed from heavy marine-grade vinyl or the like. Preferably, a foam layer 57 is sandwiched between the interior and exterior vinyl layers 54, 56. Foam layer 57 may have a thickness of approximately ¼ of an inch, for example. The layers 54, 56 are secured to laterally opposed surfaces of the foam 57 through application of any suitable adhesive or the like, and are further preferably sewn together with high-quality polyester thread 50. As shown in FIG. 4, the stitching preferably has a conventional diamond, quilt-like pattern for added strength. The interior and exterior layers 54, 56, and the foam layer 57 act as a noise barrier, muffling sounds from the exterior of the truck 12. Additionally, a vinyl border 52 or the like preferably seals the edges of layers 54, 56 and the foam layer 57.

Exterior layer 56 of each panel of kit 10 reflects sunlight, and foam layer 57 provides additional thermal and acoustic insulation, thus forming an effective thermal and acoustic barrier for the occupants of truck 12. The panels 22, 24, 26, 28 are releasably mounted to the inner surfaces of the windshields 16, 18 and windows 14 of the truck 12 by any suitable type of releasable fasteners, such as, for example, hook and loop fasteners 58, 59 and/or snaps 60, 61. As best shown in FIG. 3, a fastener is secured to a window or windshield corner, for releasable attachment of a complementary fastener mounted to a corresponding corner of one of the panels. By attachment along the corners, the windows 14 and the windshield 16, 18 are completely covered by the panels of kit 10, thus securing the privacy of the occupants of truck 12. For example, a hook fastener 58 may be secured to the interior face of a window by an adhesive or the like, with the corresponding loop fastener being permanently secured to the corner of the respective panel. Similarly, a button-type snap fastener 60 may be secured to the interior face of a window by an adhesive or the like, with the corresponding washer fastener being permanently secured to the corner of the respective panel.

As noted above, any suitable type of means for attachment may be utilized. However, in the preferred embodiment, in order to connect the panels 22, 24, 26, 28 to the inner part of the windshields 16, 18 and windows 14 of the truck 12, a number of hook and loop washer structures 58, 59 and snapped shaped members 60, 61, are used. These snapped shaped members 60, 61 are metal buttons and rivets driven through the plastic washer structures with loop adhesive tabs 58, 59 to secure them along the edge 52 of each of the panels 22, 24, 26, 28 (i.e., these snapped shaped members 60, 61 attach to the corresponding washer structures with loop self-adhesive tabs 58, 59 located on the windshield 16, 18 or on the glass around the window 14). Thus, the windows 14 and the windshield 16, 18 are completely covered, and the privacy of the inner part of the truck 12 is secured. The combination of the snapped shaped members 60, 61 with the hook and loop fasteners allows for the aesthetic appearance of snap fasteners, but with the ease of adhesively backed hook and loop fasteners. Any suitable type of hook and loop fasteners may be used, such as Velcro with adhesive backing, or Dual Lock tape, manufactured by 3M, for example. It should be understood that any suitable type of releasable fastener may be utilized.

Alternatively, the corresponding washer structures 58, 59 can be secured to the frame around the glass of the windshields 16, 18 or windows 14. This also will completely cover the windows 14 and the windshields 16, 18 and secure the inner part of the truck 12. The washer structures 58, 59 can be any of the common type of available washer structures. After the rivet is fixed to mount the washer structure to the panel, the snap button caps 60, 61 are added, thus providing an aesthetic snap button look with easy installation and removal.

It is to be understood that the present invention is not limited to the embodiment described above, but encompasses any and all embodiments within the scope of the following claims.

I claim:

1. A motor vehicle windshield and window kit, comprising:
a plurality of insulated panels for releasably covering respective interior surfaces of a motor vehicle windshield and motor vehicle window, the panels being dimensioned in at least first and second similarly contoured paired configurations commensurate with the windshield and window, wherein the first and second pairs are uniquely dimensioned; each said insulated panel comprises:
   i) a marine-grade vinyl exterior layer;
   ii) a marine-grade vinyl interior layer;
   iii) an approximately one-quarter inch thick foam layer sandwiched between the interior and exterior layers;
   iv) the exterior, interior, and foam layers being secured together by a diamond-shaped stitching pattern;
a plurality of releasable fasteners for releasably securing the plurality of insulated panels to the interior surfaces of the motor vehicle windshield and the motor vehicle window, so that the insulated panels cover the motor vehicle windshield and the motor vehicle window to provide privacy, thermal insulation and acoustic insulation for the interior of the motor vehicle;
a border seal for sealing the peripheral edges of the exterior layer, the interior layer and the foam layer to one another; and
at least one viewing opening substantially centrally formed through each of the plurality of insulated window panels only, wherein the windshield panels define substantially imperforate panel layers.

2. The motor vehicle windshield and window kit as recited in claim 1, wherein the border seal is formed from vinyl.

3. The motor vehicle windshield and window kit as recited in claim 1, wherein said plurality of releasable fasteners comprise a plurality of hook and loop fasteners.

4. The motor vehicle windshield and window kit as recited in claim 3, wherein one of said hook and loop fasteners is fixed to a respective corner of a respective one of said insulated panels, and the other of said hook and loop fasteners is secured to a respective one of the motor vehicle windshield and window by an adhesive.

5. The motor vehicle windshield and window kit as recited in claim 1, wherein said plurality of releasable fasteners comprise a plurality of snap fasteners, each said snap fastener including a button portion and a corresponding washer portion.

6. The motor vehicle windshield and window kit as recited in claim 5, wherein one of said button and washer portions is fixed to a respective corner of a respective one of said insulated panels, and the other of said button and washer portions is secured to a respective one of the motor vehicle windshield and window by adhesive.

7. The motor vehicle window cover panel as recited in claim 1, wherein the at least one viewing opening comprises a privacy flap.

8. The motor vehicle windshield and window kit as recited in claim 7, wherein the at least one privacy flap is substantially rectangular.

* * * * *